United States Patent [19]

Hardin

[11] 4,186,762

[45] Feb. 5, 1980

[54] CONTROL DEVICE MOUNTING MEANS AND PARTS THEREFOR

[75] Inventor: George T. Hardin, Knoxville, Tenn.

[73] Assignee: Robertshaw Controls Company, Richmond, Va.

[21] Appl. No.: 943,666

[22] Filed: Sep. 18, 1978

[51] Int. Cl.² .................... F16L 3/00; G12B 9/00
[52] U.S. Cl. .................... 137/343; 137/551; 200/296; 248/271; 403/349
[58] Field of Search ............ 200/296; 248/27.1, 27.3, 248/73, 222.3; 339/125; 403/349, 254, 255, 258; 137/360, 551, 343

[56] References Cited

U.S. PATENT DOCUMENTS

| | | | |
|---|---|---|---|
| 1,657,005 | 1/1928 | Douglas | 200/296 |
| 1,734,315 | 11/1929 | Weisenfels | 248/27.1 |
| 2,272,688 | 2/1942 | Catron | 200/296 |
| 2,689,700 | 9/1954 | Drury | 248/27.1 |

Primary Examiner—John W. Shepperd
Attorney, Agent, or Firm—Candor, Candor & Tassone

[57] ABSTRACT

A control device having a cap telescoped through a mounting opening in a control panel and being secured thereto by a nut threaded on the cap and disposed against one side of the panel and a fastener carried by the cap and disposed against the other side of the panel, the fastener comprising a substantially flat plate spanning the opening of the panel and having a bayonet opening passing therethrough and aligned with the opening of the panel and the cap having a bayonet portion extending completely through the bayonet opening and cooperating with the bayonet opening to lock the cap and plate together.

10 Claims, 6 Drawing Figures

CONTROL DEVICE MOUNTING MEANS AND PARTS THEREFOR

BACKGROUND OF THE INVENTION

1. Field of the Invention

This invention relates to an improved mounting means for a control device or the like and to improved parts of such mounting means.

2. Prior Art Statement

It is known to telescope a threaded cap of a control device through a mounting opening in a control panel to be secured thereto by a nut threaded on the cap and disposed against one side of the panel and fastening means carried by the cap and disposed against the other side of the panel.

For example, see FIG. 1 of the drawings of this application wherein such prior art structure is illustrated.

It can be seen from FIG. 1 that the fastening means comprises another nut threaded on the cap and being threaded against a washer-like dial member also telescopically disposed on the cap to be sandwiched between the fastening means and the control panel.

Other types of fastening means for mounting control devices to control panels have been provided and the U.S. patent to Owen, U.S. Pat. No. 3,331,936 and U.S. patent to Frank, U.S. Pat. No. 3,371,180 are merely illustrative of such other types of control device mounting means.

SUMMARY OF THE INVENTION

It is a feature of this invention to provide improved means for mounting a control device to a control panel having a conventional mounting opening or the like provided therein.

In particular, it was found that the conventional means for mounting a control device to a control panel does not provide a convenient method for orienting the control device relative to the mounting hole in the panel and additionally, if sufficient torque or vibration is applied to the control device, the conventional mounting hardware might loosen, resulting in an assembly that could twist out of position for proper orientation with a control dial for the control device.

Thus, it was found according to the teachings of this invention that improved mounting means can be provided for the free end of a control device cap that projects through the mounting opening of the control panel to be secured thereto, such improved mounting means of this invention comprising a uniquely formed mounting plate or member and a uniquely formed end of the projecting cap of the control device.

In particular, one embodiment of this invention provides the combination of a control device having a threaded cap telescoped through a mounting opening in a control panel and being secured thereto by a nut threaded on the cap and disposed against one side of the panel and means carried by the cap and disposed against the other side of the panel, such means comprising a substantially flat plate spanning the opening of the panel and having a bayonet opening passing therethrough and aligned with the opening of the panel and the cap having a bayonet portion extending completely through the bayonet opening cooperating with the bayonet opening to lock and cap and plate together in a quick connect and disconnect manner.

It was also found according to the teachings of this invention that if such uniquely formed plate also contained the dial face for the control device, a separate dial of the conventional control device mounting means can be eliminated.

Accordingly, it is an object of this invention to provide an improved control device mounting means, the mounting means of this invention having one or more of the novel features of this invention as set forth above or hereinafter shown or described.

Another object of this invention is to provide improved parts for such mounting means or the like, each improved part of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1A is a reduced fragmentary view illustrating the standard knock-out mounting hole provided in conventional control panels and the like.

DESCRIPTION OF THE PREFERRED EMBODIMENT

Figure 1:
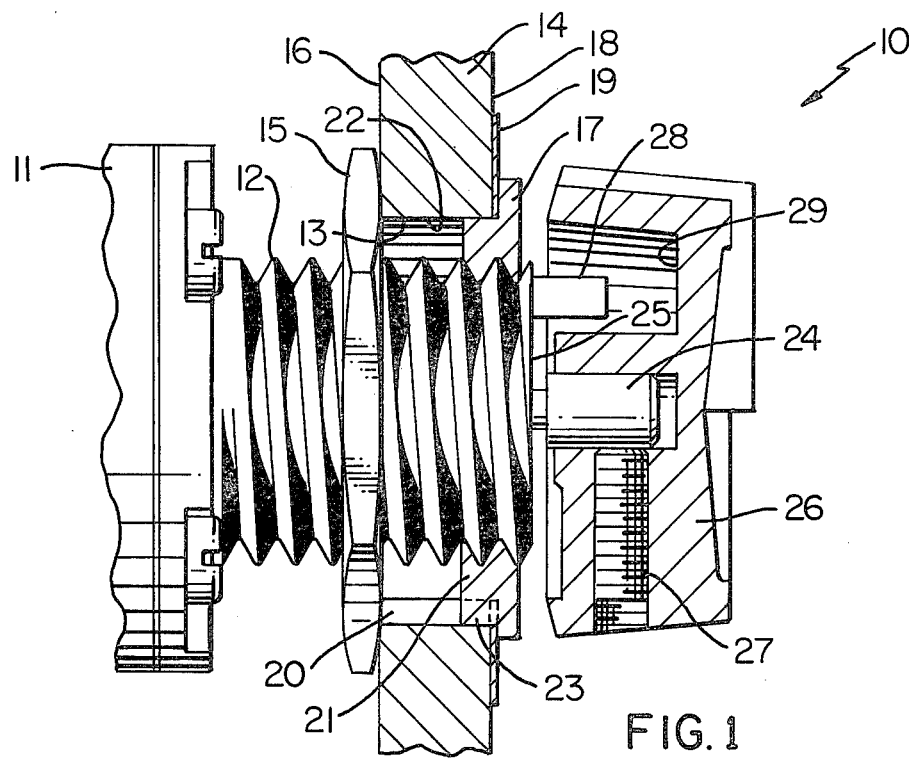
FIG. 1 is a fragmentary cross-sectional view illustrating a prior art control device mounting means.

While the various features of this invention are hereinafter illustrated and described as being particularly adapted to mount control devices having control knobs thereon, it is to be understood that the various features of this invention can be utilized singly or in any combination thereof to mount other types of control devices as desired.

Therefore, this invention is not to be limited to only the embodiment illustrated in the drawings, because the drawings are merely utilized to illustrate one of the wide variety of uses of this invention.

It is believed that in order to best understand the unique features of this invention, a conventional prior art control device mounting means should be first described whereby reference is now made to FIG. 1 wherein a prior art control device mounting means is generally indicated by the reference numeral 10.

As illustrated in FIG. 1, the prior art mounting means 10 comprises a control device 11 having a threaded cap 12 projecting through a standard substantially circular, knock-out mounting opening 13 formed in a control panel 14 and being secured thereto by a first nut 15 threaded on the cap 12 and disposed against the side 16 of the control panel 14 while another threaded nut 17 is threaded on the cap 12 and, in effect, is disposed against the other side 18 of the control panel 14. However, a suitable washer-like dial member or plate 19 is telescopically disposed on the cap 12 and against the side 18 of the control panel 14 to be held thereagainst by the threaded member 17 as illustrated.

Figure 1A:
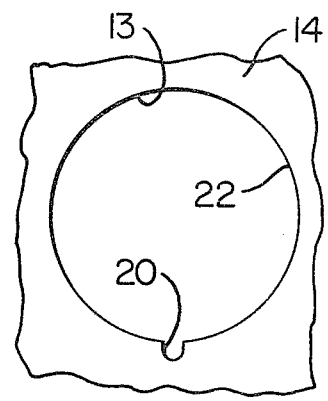

As best illustrated in FIG. 1A, the conventional circular opening 13 in the control panel 14 joins with a key-notch 20 for holding the nut 17 from turning in the opening 13.

In particular, as illustrated in FIG. 1, the nut 17 has a reduced portion 21 that is received in the circular opening 13 against the internal edge 22 thereof while a depending tongue portion 23 of the nut 17 is received in the key notch 20 in a splinning manner therewith.

The cap 12 normally has a control shaft 24 projecting from the free end 25 thereof and on which a control knob 26 can be mounted and fastened thereto by a set screw 27 in a manner well known in the art, the end 25 of the cap 12 having a projection 28 that cooperates with a slot means 29 in a knob 26 to orient the knob 26 on the shaft 24 and limit rotational movement of the knob 26 and, thus, rotational movement of the control shaft 24.

In this manner, by orienting the rotational position of the dial 19 with the projection 28 on the cap 12, the control knob 26 can be oriented relative to the markings on the dial 19 to guide the operator in properly selecting the setting of the control device 11.

However, as previously described, there is no convenient means of orienting the control device 11 relative to the key notch 20 of the mounting hole 13 so that when the control device 11 is assembled to the control panel in the manner previously described, the member 28 could be disposed in any rotational position relative to the notch 20 so that an "off" position of the control device 26 may be down, up or sideways relative to the key notch 20 as the case may be.

Further, it is believed that if sufficient torque or vibration is applied to the control device 11, the nut 17 can loosen to permit the control device 11 to twist out of its rotational position relative to the dial 19 to provide for a missetting of the control device 11.

Figure 2:
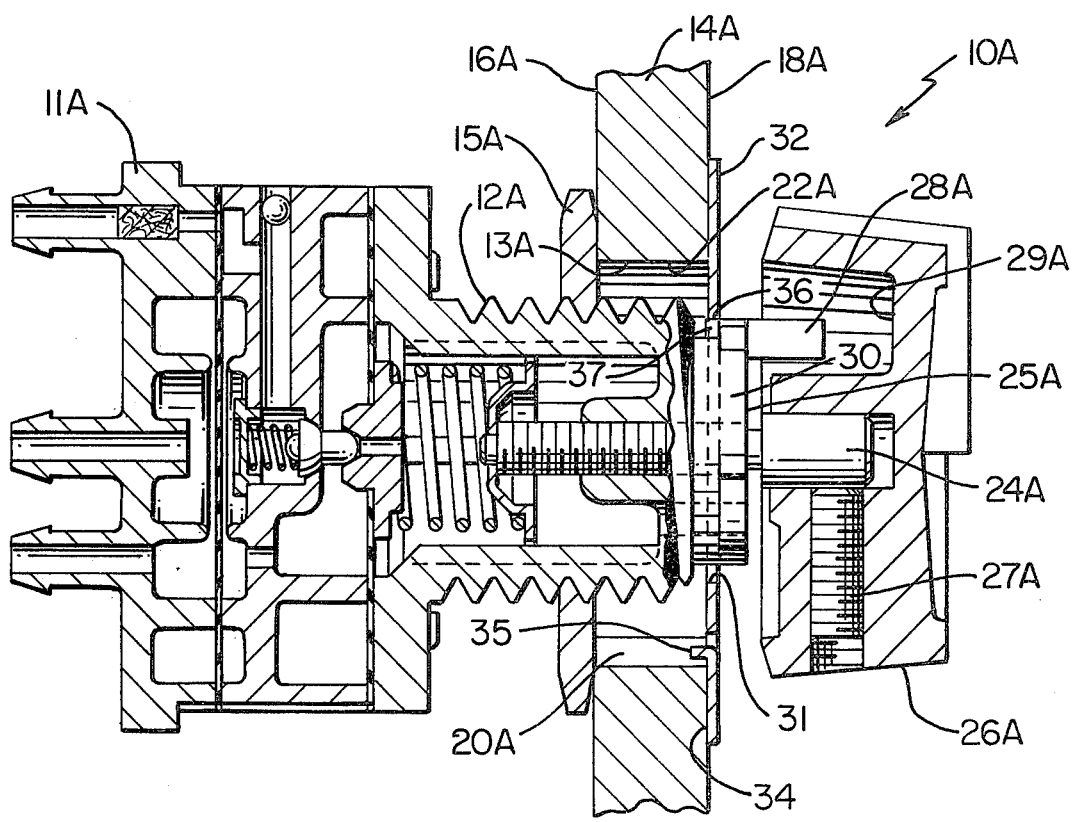
FIG. 2 is a view similar to FIG. 1 and illustrates the improved control device mounting means of this invention.

These problems as well as others are believed to be solved by the improved control device mounting means of this invention that is generally indicated by the reference numeral 10A in FIG. 2 and parts thereof similar to the prior art mounting means 10 are indicated by like reference numerals followed by the reference letter "A".

As illustrated in FIG. 2, the improved control device mounting means 10A of this invention includes a control device 11A having a threaded cap 12A carrying the nut 15A for being disposed against the side 16A of the control panel 14A while the cap 12A projects through the mounting opening 13A in the manner previously described.

However, the end 25A of the cap 12A of this invention is provided with a quick connect-disconnect bayonet portion 30 that cooperates with a quick connect-disconnect bayonet opening 31 in a unique mounting plate 32 of this invention that is disposed against the side 18A of the control panel 14A not only to lock the cap 12A to the plate 32, but also to secure the control device 11A to the control panel 14A as illustrated with the plate 32 positively orienting the cap 12A relative to the key notch 20A of the mounting opening 13A in a manner hereinafter described so that the control knob 26A and projection 28A of the cap 12A are always properly oriented relative to the key notch 20A of the opening 13A.

Figure 3:
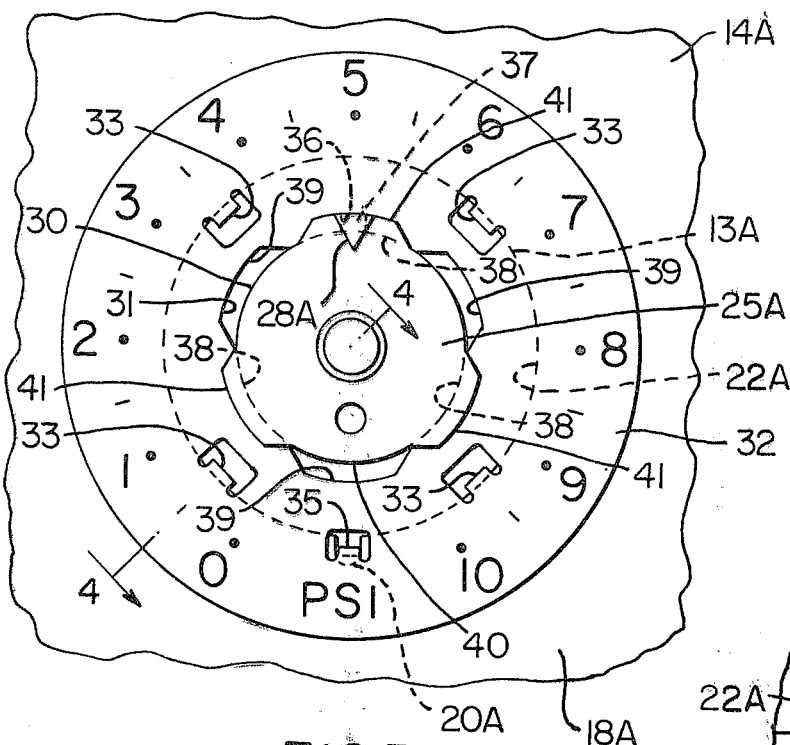
FIG. 3 is a front view of the mounting means illustrated in FIG. 2 with the control knob of the control device removed.
Figure 5:
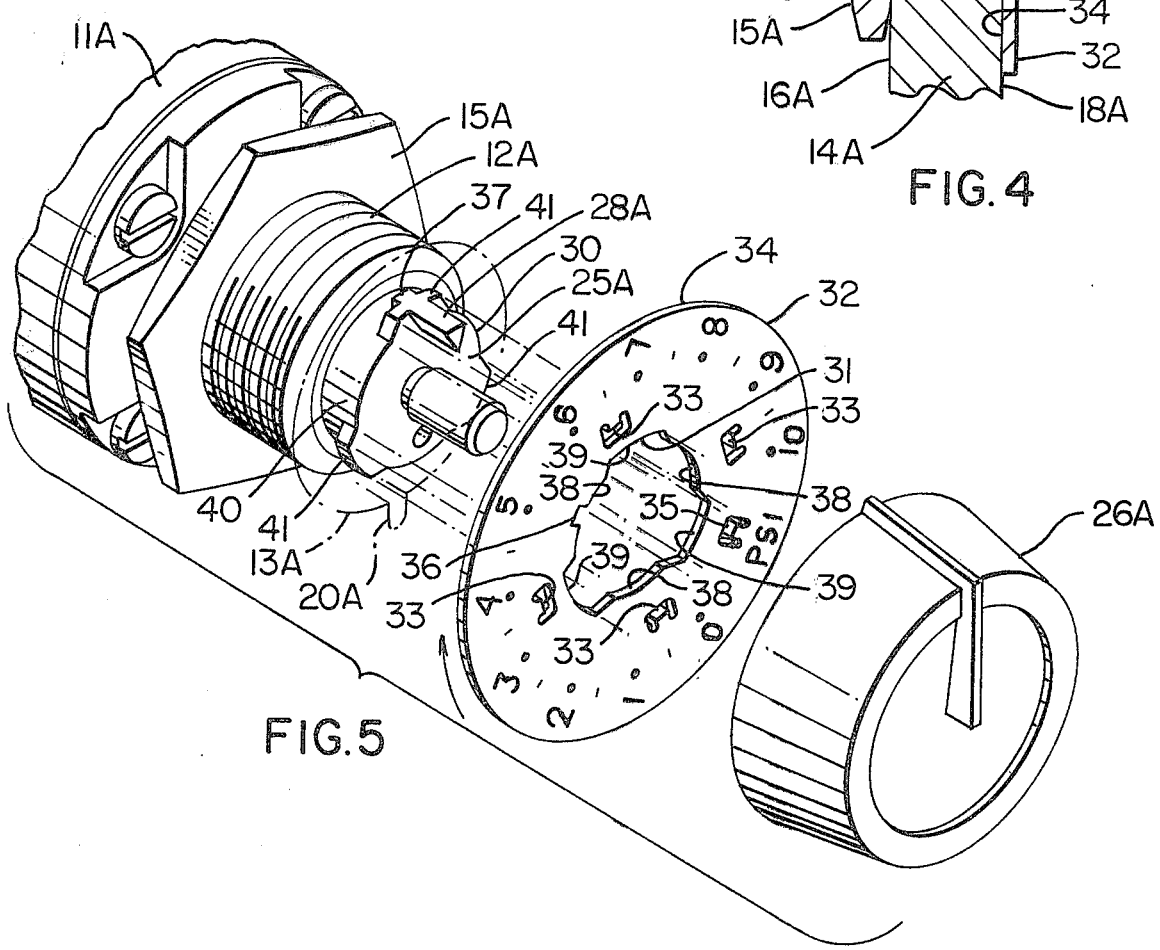
FIG. 5 is a fragmentary exploded perspective view of the control device mounting means of FIG. 2.

As illustrated in FIGS. 3 and 5, the plate 32 of this invention can also provide the dial means for the control device 11A so that the separate dial 19 of the prior art mounting means 10 is, in effect, eliminated by this invention.

Figure 4:
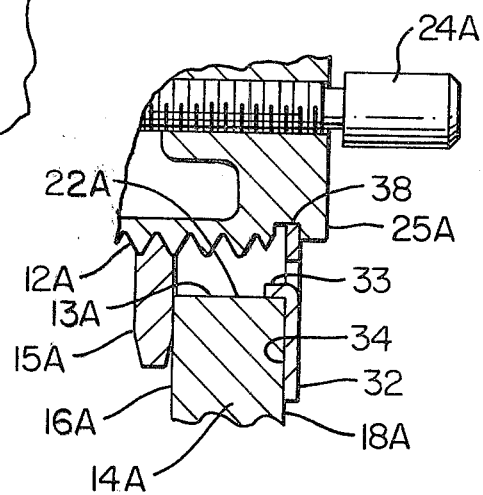
FIG. 4 is a fragmentary cross-sectional view taken on line 4—4 of FIG. 3.

The plate 32 as illustrated in FIGS. 3 and 5 has a plurality of tabs 33 bent therefrom to project from the side 34 thereof in such a circular pattern that the tabs 33 engage against the internal edge 22A of the opening 13A of the control panel 14A as illustrated in FIGS. 3 and 4 to properly position the plate 32 relative to the opening 13A while an additional tab 35 of the plate 32 is positioned in the notch 20A as illustrated in FIG. 2 to properly orient the rotational position of the plate 32 relative to the opening 13A in the control panel 14A so that the dial figures on the plate 32 will be oriented relative to the key notch 20A of the control panel 14A.

In addition, the plate 32 is provided with an orienting notch 36 that intersects with the bayonet opening 31 thereof and is adapted to receive a cooperating tongue 37 of the bayonet portion 30 of the cap 12A therein in the manner illustrated in FIG. 2 to orient the cap 12A and, thus, the control device 11A relative to the key notch 20A of the control panel 14A so that the stop member 28A thereof will be properly oriented relative to the dial face of the plate 32 and, thus, the control knob 26A will be properly oriented relative to the dial plate 32 for the reasons previously set forth.

The bayonet opening 31 of the plate 32 comprises a plurality of tongues 38 that project radially into the opening 31 and are radially spaced apart in such a manner that the same define a plurality of equally spaced spaces 39 therebetween, three such tongues 38 and spaces 39 being illustrated for the embodiment of the invention illustrated in the drawings.

The bayonet portion 30 of the cap 12A of the control device 11A is provided with a reduced cylindrical section 40 having a plurality of outwardly directed tongues 41 that are equally spaced about the cylindrical portion 40 and are a configuration similar to the spaces 39 between the tongues 38 of the plate 32 whereby when the cap 12A is being assembled to the plate 32, the tongues 41 of the cap 12A are adapted to project through the spaces 39 of the plate 32 and once passing therethrough, the control device 12A can be slightly rotated to bring the tongues 41 of the cap 12A in overlapping relation with the tongues 38 of the plate 32 in the manner illustrated in FIG. 2 to lock the plate 32 and cap 12A together. Thereafter, the nut 15A can be run up and tightened on the cap 12A to compress against the side 16A of the control panel 14A to secure the control device 11A to the panel 14A.

Therefore, it can be seen that the mounting means 10A of this invention can be formed in a relatively simply manner be merely providing the bayonet portion 30 on the cap 12A of the control device 11A and forming the bayonet opening 31 in a plate 32 to be assembled therewith in a manner now to be described.

When it is desired to assemble the control device 11A to the control panel 14A, the knob 26A is removed from the control shaft 24A and the nut 15A is rotated to back the same down the cap 12A toward the control device 11A so that a sufficient portion of the cap 12A can be projected through the opening 13A of the control panel 14A from the side 16A thereof.

However, first, the plate 32 is disposed in the opening 13A by having the tabs 33 project into the opening 13A from the side 18A of the panel 14A as well as having the locating tab 35 received in the key notch 20A as illustrated in FIG. 2 so that the dial plate 32 will be disposed against the side 18A of the panel 14A in a proper rotational position relative thereto.

The assembler then holds the control device 11A so that the locating tongue 37 on the cap 12A thereof will be disposed to project through one of the spaces 39 of the plate 32 on either side of the locating notch 36 of the plate 32 whereby the tongues 41 of the bayonet portion 30 of the cap 12A are projected through the spaces 39 of the plate 32 until the tongue 37 clears the plate 32 in such a manner that the assembler can rotate the control device 11A to bring the tongue 37 into registry with the locating notch 36 of the plate 32. At this time, the assembler pulls backwardly on the control device 11A to bring the tongue 37 into the notch 36 as illustrated in FIG. 2 whereby the tongues 41 of the bayonet portion 30 of the cap 12A are brought against the tongues 38 of the plate 32 in overlapping relation therewith as illustrated in FIG. 3. With the control device 11A now held in this oriented position by the cooperating notch 36 and tongue 37, the nut 15A is rotated on the cap 12A until the same abuts against the side 16A of the control panel 14A as illustrated in FIG. 2 to thereby be tightened thereagainst and fastened the control device 11A in the assembled condition as illustrated in FIG. 2.

In this manner, it can be seen that not only is the bayonet portion 30 of the cap 12A locked to the bayonet opening 31 of the plate 32 in a quick connect-disconnect relation therewith, but also the control device 11A is properly oriented relative to the dial plate 32 through the cooperation of the plate tab 35 in the notch 20A of the mounting opening 13A and the orientation of the locating tongue 37 of the cap 12A and the locating notch 36 of the plate 32.

Therefore, it can be seen that this invention not only provides an improved mounting means for a control device, but also this invention provides improved parts for such a mounting means or the like.

While the forms of the invention now preferred have been illustrated and described as required by the Patent Statute, it is to be understood that other forms can be utilized and still fall within the scope of the appended claims.

What is claimed is:

1. In the combination of a control device having a threaded cap telescoped through a mounting opening in a control panel and being secured thereto by a nut threaded on said cap and disposed against one side of said panel and means carried by said cap and disposed against the other side of said panel, the improvement wherein said means comprises a substantially flat plate spanning said opening of said panel and having a bayonet opening passing therethrough and aligned with said opening of said panel, said plate having a plurality of spaced apart tabs extending therefrom into said opening of said panel, said tabs being disposed outboard of said bayonet opening said cap having a bayonet portion extending completely through said bayonet opening and cooperating with said bayonet opening to lock said cap and plate together.

2. A combination as set forth in claim 1 wherein said opening of said panel defines a substantially circular edge, said panel having a locating notch intersecting with said edge, said plate having one of said tabs disposed in said notch and the other of said tabs engaging said edge whereby said tabs orient said plate in said opening of said panel.

3. A combination as set forth in claim 1 wherein said plate provides a dial face for said control device.

4. A combination as set forth in claim 1 wherein said plate has a notch that joins with said bayonet opening said cap having a tab received in said notch to orient said cap relative to said bayonet opening.

5. A combination as set forth in claim 1 wherein said bayonet portion of said cap has a plurality of spaced apart tongues radiating therefrom.

6. A combination as set forth in claim 5 wherein said plate has a plurality of spaced apart tongues radiating inwardly into said bayonet opening thereof whereby said tongues of said plate and said cap cooperate together to lock said plate and cap together.

7. In a fastening means for a combination of a control device having a threaded cap telescoped through a mounting opening in a control panel and being secured thereto by a nut threaded on said cap and disposed against one side of said panel and said fastening means carried by said cap and disposed against the other side of said panel, the improvement wherein said fastening means comprises a substantially flat plate adapted to span said opening of said panel and having a bayonet opening passing therethrough and being adapted to be aligned with said opening of said panel and cooperate with a bayonet portion of said cap that extends completely through said bayonet opening to lock said cap and plate together wherein said plate has a plurality of tabs extending therefrom and adapted to extend into said opening of said panel.

8. A fastening means as set forth in claim 7 wherein said opening of said panel defines a substantially circular edge and said panel has a locating notch intersecting with said edge, said plate having one of said tabs adapted to be disposed in said notch and the other of said tabs adapted to engage said edge whereby said tabs are adapted to orient said plate in said opening of said panel.

9. A fastening means as set forth in claim 7 wherein said plate provides a dial face for said control device.

10. A fastening means as set forth in claim 7 wherein said plate has a notch that joins with said bayonet opening whereby said notch is adapted to receive a tab of said cap to orient said cap.

* * * * *